Feb. 13, 1934.  C. G. JONES  1,947,089

PIPE WELDING

Filed Feb. 17, 1931

WITNESS
E. C. Liding

INVENTOR
Carl G. Jones.
BY
Wesley G. Carr
ATTORNEY

Patented Feb. 13, 1934

1,947,089

UNITED STATES PATENT OFFICE 1,947,089

PIPE WELDING

Carl G. Jones, Wilkinsburg, Pa., assignor to Westinghouse Electric & Manufacturing Company, a corporation of Pennsylvania Application February 17, 1931. Serial No. 516,296

15 Claims. (Cl. 219—6)

My invention relates to inductive heating and more particularly to means for inductively heating pipe blanks to be welded.

An object of my invention is to provide a means for ensuring that substantially the entire length of a pipe blank shall be properly heated to permit of its being welded.

My invention is to be operatively associated with a pipe-welding machine including a main energizing coil of relatively large axial length for heating a pipe blank by induction and is particularly effective in ensuring that substantially all of the trailing end of a moving pipe blank shall be properly heated to a welding temperature.

In practicing my invention, I provide a pipe-welding machine including, more particularly, a pair of spaced standards carrying guide and pinch rolls, respectively, and a properly supported main energizing coil, as well as a laminated core structure and, associate therewith, an auxiliary single-turn coil inductively energized, under certain operating conditions, from the main energizing coil, the auxiliary coil being provided with brushes for engagement with the pipe blank to conduct current thereto.

Figure 1:
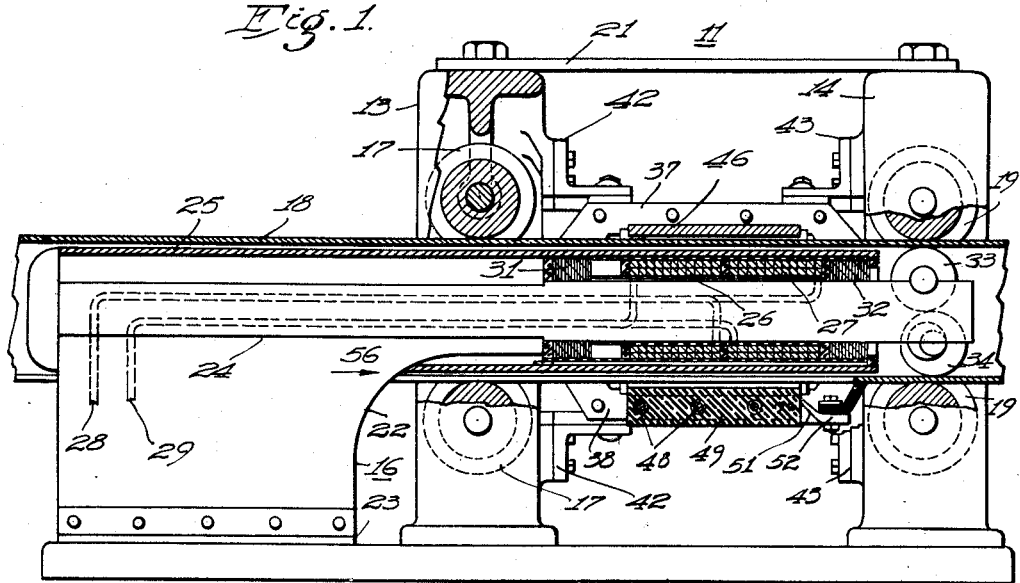
Figure 2:
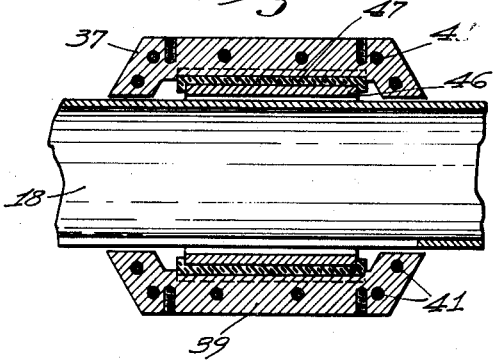
Figure 3:
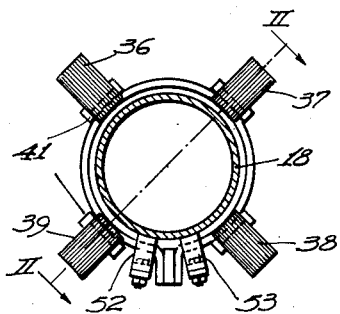
Figure 4:
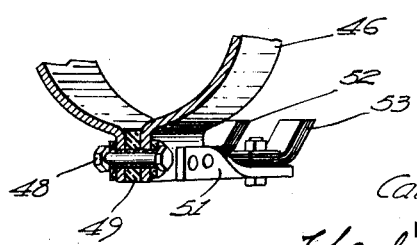

In the single sheet of drawing,

Figure 1 is a view, mainly in longitudinal vertical section, through a pipe-welding machine, with which is associated the device more particularly embodying my invention, Fig. 2 is a fragmentary view, in longitudinal section, taken on the line II—II of Fig. 3, Fig. 3 is a view, in lateral section, illustrating more particularly the device embodying my invention, and Fig. 4 is a fragmentary view, in perspective, of the auxiliary coil particularly embodying my invention.

Referring to Fig. 1 of the drawing, I have there illustrated a pipe-welding machine 11 as including a suitable metal bed-plate 12, a leading standard 13, a trailing standard 14 and a coil-and-core-supporting member 16. The leading standard 13 is shown generally only and is utilized more particularly to support a plurality of uniformly peripherally spaced rotatable guide rolls 17, the outer peripheral surfaces of which are of arcuate shape laterally of the roll and of such radial dimension as to fit closely against a moving pipe blank 18.

The trailing standard 14 has a plurality of pinch rolls 19 rotatively mounted therein which are of substantially the same general shape as the guide rolls 17. While I have illustrated two diametrically opposite rolls in each of the standards, it is to be understood that any desired number of such rolls may be utilized, such as three or four or more. A cross-bar 21 is secured to the top of the two standards to maintain their initial spacing, and, while no securing means for the bottom portions of the standards have been illustrated, it is to be understood that such securing means are provided. Specific details of these elements have not been illustrated more particularly because such specific details are not essential to my invention.

The coil-and-core supporting means 16 includes a vertically extending web-plate 22, which may be of relatively thick sheet steel or other similar metal, having angle-bar members 23 secured thereagainst at its bottom portion to permit of supporting the member 16 on, and securing it against, the bed-plate 12.

The member 22 is of substantially L-shape and supports a box-like structure 24 which may be built up of structural elements, as may be found necessary or desirable, and a tubular member 25 for guiding the pipe blank 18.

A main energizing coil includes two plural-turn sections 26 and 27 which are indicated schematically or generally only as including a conductor of substantially square shape, although any suitable or desired form of current-conducting member may be utilized, and it is to be understood that such turns are suitably supported and are insulated from the structure 24, in a manner well known in the art. The two-coil sections may be considered as constituting the main energizing coil, and suitable terminal leads 28 and 29 extend through a portion of the structure 24 and laterally therefrom, adjacent to the web portion 22, to permit of connecting the coil sections 26 and 27, in parallel, to a suitable source of supply of alternating-current electric energy.

A laminated core structure includes portions 31 and 32 located adjacent to each end of the main energizing coil and suitably supported on the structure 24. Reaction rolls 33 and 34 are rotatably supported at the trailing end of the structure 24 to cooperate with the pinch rolls 19 to properly guide the moving guide blank and to weld the same.

A second laminated core structure includes sets of laminations, 36, 37, 38 and 39, which, as shown in Figs. 1 and 2 of the drawing, may be of substantially U-shape. Each set may be held together by insulated bolts 41, a plurality of which are provided. The sets of laminations are uniformly spaced peripherally around the outside of the pipe blank 18, and supporting brackets 42 may be bolted against standard 13, and supporting brackets 43 may be bolted against standard 14 to support the respective sets of laminations. The sets of laminations and their supports are shown generally only as their specific details are not essential to the present invention.

A secondary or auxiliary energizing coil includes, more particularly, a coaxial single-turn coil 46, which, as shown in the drawing, may be of relatively large axial length and of a suitable current-conducting material, such as copper. The conductor constituting the coil 46 is spaced from the sets of laminations by electric-insulating material 47 and may be supported directly by these sets of laminations which has been indicated in the drawing, or, if found necessary or desirable, it may be supported by additional supporting means, not shown in the drawing. The end portions of the single-turn coil 46 extend radially outward at the bottom of this structure, as shown more particularly in Fig. 4 of the drawing, and one or more suitably insulated clamping bolts 48 may extend therethrough, a spacing block 49 of electric-insulating material being located between the radial outwardly extending end portions to permit of tightly clamping the ends together, thereby stiffening, to some extent, the coil structure and ensuring that it will remain in its proper operative position during operation.

Longitudinally extending leads 51, only one of which is visible in Fig. 4 of the drawing, are suitably secured against the end portions of the coil 46, and brushes 52 and 53 are secured thereagainst, which, as shown particularly in Figs. 1 and 4 of the drawing may comprise a plurality of flexible strips of copper or other suitable current-conducting material, one end of which is secured against the respective conductors 51 and the other end of which is so located as to operatively engage the edges of the pipe blank 18 at each side of the seam, as is shown more particularly in Fig. 3 of the drawing. While I have shown one form of brushes, I do not wish to be limited thereto, as other forms of current-conducting means, such as rolls, may be employed.

The operation of the auxiliary energizing coil embodying my invention will now be explained, but the operation of the welding machine will first be explained, on the assumption that my improved auxiliary coil is not provided thereon. As the pipe blank 18 is moved in the direction of the arrow 56 (see Fig. 1), it is apparent that, so long as the main energizing coil, including the two sections 26 and 27, is located within the two ends of the pipe blank, the main energizing coil will operate as a fully loaded primary coil of a transformer, the pipe blank constituting the secondary thereof. It is necessary to ensure that the pipe blank, which is initially open, as is shown at the left-hand end of Fig. 1 of the drawing, shall have the edges thereof continuously or, at least, initially in abutting engagement in order to provide a single-turn secondary coil, in which case, the current traversing the pipe-blank periphery will encounter the greater ohmic resistance at the joint, so that the largest amount of energy will be expended at that point in heating the edges of the pipe blank adjacent to the seam thereof. If the edges remain continuously in engagement, resistance welding will be effected, while flash welding will be effected if the edges engage initially and are then separated a small distance. The cooperating rolls 19, 33 and 34 will effect the proper weld of the highly heated metal edges.

If the trailing end of the pipe blank has moved so far in the direction of the arrow 56 as to expose a part or all of coil section 26, it is apparent that this coil section will constitute a reactor, thereby reducing the energy input into the main energizing coil. As the pipe blank moves still further to the right to uncover the second section 27, this reduction in energy will be still more pronounced, and one method of overcoming this is to use a plurality of coil sections.

I provide a relatively long auxiliary energizing coil 46 which may extend axially over almost the entire length of the main energizing coil. If the trailing end of the pipe blank is located intermediate the ends of coil section 26, that part of the axial length of coil 46 which is "uncovered" will constitute a secondary coil in which current may be generated by the uncovered part of coil section 26, thereby providing a secondary coil in which voltage is induced and through which current may flow if the circuit of the coil is closed, which latter is effected by the brushes 52 and 53 engaging the pipe blank.

While it is possible to provide a relatively narrow conductor 46 or even a plurality of parallel-connected, relatively-short (that is, axially) conductors which are connected to the leads 51, I prefer, wherever possible, to utilize an axially-long conductor 46, as it will constitute a secondary coil which automatically maintains the desired degree of coupling with the uncovered main energizing coil and will, therefore, ensure that substantially the same full-load current will traverse the respective coil sections 26 and 27 when the same are not covered by the pipe blank, as was the case when they were so covered.

The device embodying my invention thus provides an auxiliary energizing coil the inductive coupling of which, with the main energizing coil or with the moving pipe blank, is effective to provide auxiliary energy obtained by an inductive connection or coupling with the main energizing coil to provide additional current for the pipe blank at the point where the weld is being effected, in order to maintain the energy input into the seam substantially constant, and it is to be noted that this supplementary heating of the pipe blank is controlled by the pipe blank itself, in its movement through the machine. The device embodying my invention is, of course, particularly effective at the trailing end and will reduce the amount of pipe to be cropped or cut off at that end.

Various modifications may be made in my invention without departing from the spirit and scope thereof, and I desire, therefore, that only such limitations shall be placed thereon as are imposed by the prior art or are set forth in the appended claims.

I claim as my invention:

1. In a system for heating a piece of material, a main coil traversed by an alternating current and positioned to supply energy to heat the piece of material inductively, an auxiliary coil disposed in inductive relation to the main coil and circuit means connecting the auxiliary coil to the piece of material to conduct current thereto.

2. A machine for heating a moving pipe blank including a main coil positioned to supply energy to heat the moving pipe blank, by inductive action thereon, an auxiliary coil disposed in inductive relation to the main coil, and circuit means connecting the auxiliary coil to the pipe blank to further effect the heating thereof conductively, the auxiliary coil energization being controlled by the movement of the pipe blank.

3. A machine for heating a moving pipe blank comprising a main coil located on the inside of the pipe blank and heating the same inductively, an auxiliary coil located on the outside of the pipe blank and inductively disposed relative to the main coil, and circuit means to conduct current from the auxiliary coil to the pipe blank to heat a predetermined portion thereof, the auxiliary coil being effective in certain positions of the pipe blank.

4. A machine for heating a moving pipe blank including a main coil located on the inside of the pipe blank for heating the same by an inductive transfer of energy thereto, an auxiliary coil located on the outside of the pipe blank, said auxiliary coil being disposed in inductive relation to the main coil and rendered substantially de-energized by the pipe blank as long as the main coil is located between the ends of the pipe blank, and circuit means secured to the auxiliary coil and connected to effect current heating of the trailing end of the pipe blank by direct contact therewith.

5. A machine for heating a moving pipe blank including a main coil located on the inside of the pipe blank for heating the same by inductive action, an auxiliary coil located on the outside of the pipe blank in inductive relation to the main coil, and terminals connected to the auxiliary coil and operatively engaging the pipe blank to conduct current thereto, the auxiliary coil being inductively energized by the main coil when the trailing end of the pipe blank is located intermediate the ends of the main coil.

6. A machine for heating a moving pipe blank including a main coil located inside of the pipe blank for heating the same by induction, an auxiliary coil on the outside of and coaxial with the pipe blank and inductively energized by the main coil when the pipe blank has moved to such position as to at least partially uncover the main coil, and contact members on the auxiliary coil engaging the pipe blank to conduct current thereto.

7. A device for heating a piece of material including a main coil in inductive relation to the material to heat the same inductively, an auxiliary coil inductively related to the main coil and energized thereby, and means associated with the auxiliary coil conducting the current induced in the auxiliary coil to the material to heat the same conductively.

8. A device as set forth in claim 7, in which the two coils are concentric and the main coil is located on one side of the material and the auxiliary coil is located on the other side of the material.

9. A device as set forth in claim 7, in which the two coils are substantially concentric and coextensive and both coils are substantially concentric with the piece of material being heated, which piece of material is movable to heat successive portions thereof and in which the auxiliary coil is effective when one end of the moving piece of material is intermediate the ends of the main coil.

10. A machine for heating a moving pipe blank comprising a main coil located at one side of the pipe blank and heating the same inductively, an auxiliary coil located at the other side of the pipe blank, inductively energized by the main coil and having means to conduct current to the pipe blank to heat a predetermined portion thereof, the auxiliary coil being effective in certain positions of the pipe blank, said main coil, auxiliary coil and pipe blank being disposed substantially concentrically.

11. A machine for heating a moving pipe blank including a main coil located at one side of the pipe blank for heating the same by inductive action, an auxiliary coil located at the other side of the pipe blank having terminals operatively engaging the pipe blank to conduct current thereto, the auxiliary coil being inductively energized by the main coil when the trailing end of the pipe blank is located intermediate the ends of the main coil, said main and auxiliary coils being disposed substantially concentrically and coextensively.

12. A device for heating a moving pipe blank including a main coil concentric with and at one side of the pipe blank to heat the same inductively, an auxiliary coil substantially coextensive and coaxial with the main coil and on the other side of the pipe blank, and means on the auxiliary coil engaging the pipe blank, the auxiliary coil being inductively energized by the main coil when the pipe blank at least partially uncovers the main coil so that the auxiliary coil effects current heating of the trailing end of the pipe blank.

13. A machine for welding a moving pipe blank including a set of pinch rolls engaging the pipe blank, electric means located ahead of the pinch rolls heating the edges of the pipe blank and including a main coil substantially concentric with the pipe blank and effecting inductive heating of the pipe blank and particularly of the edges thereof, an auxiliary coil concentric with the main coil and current leads on the auxiliary coil having brushes operatively engaging the edges of the pipe blank between the trailing end of the main coil and the pinch rolls, the auxiliary coil being inductively energized by the main coil when the trailing end of the pipe blank is located intermediate the ends of the main coil.

14. A device as set forth in claim 13, in which the axial width of conductor of the auxiliary coil is substantially equal to the axial length of the main coil.

15. A device as set forth in claim 13, in which the main coil is located inside of the pipe blank, the auxiliary coil is located on the outside of the pipe blank and the axial width of the auxiliary coil conductor is substantially equal to the axial length of the main coil.

CARL G. JONES.